June 19, 1928.

A. G. F. WALLGREN 1,673,959

YIELDABLE COUPLING, TOOTHED WHEEL, AND THE LIKE

Filed Aug. 3, 1926  2 Sheets-Sheet 1

Inventor
A. G. F. Wallgren
By Marks & Clerk
Attys.

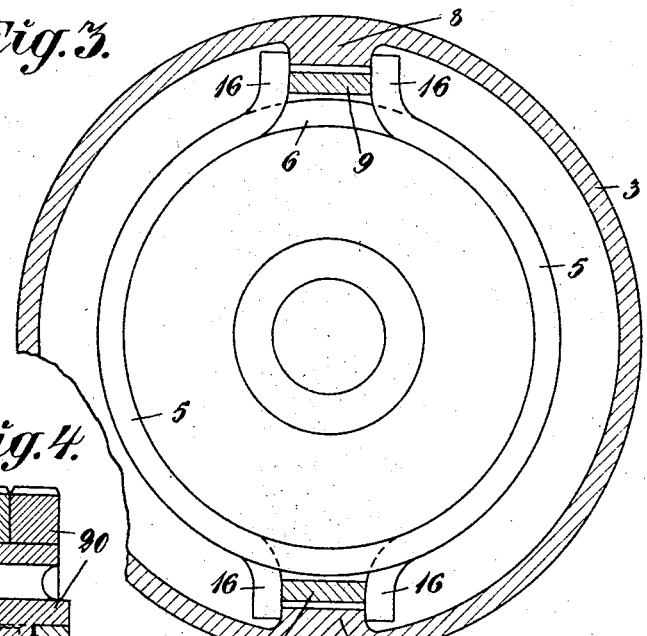
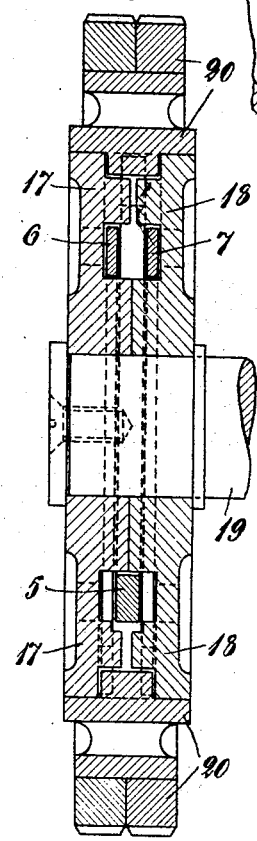
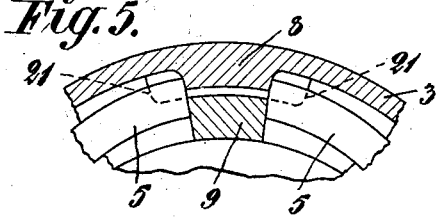
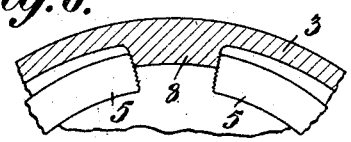
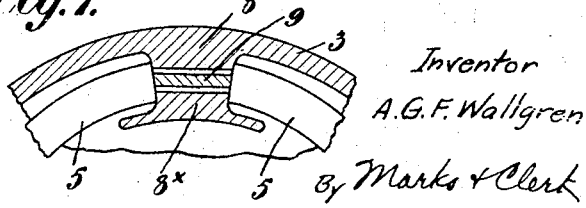
Inventor
A.G.F. Wallgren
By Marks & Clerk
Attys.

Patented June 19, 1928.

1,673,959

UNITED STATES PATENT OFFICE.

AUGUST GUNNAR FERDINAND WALLGREN, OF STOCKHOLM, SWEDEN, ASSIGNOR TO LUTH & ROSÉNS ELEKTRISKA AKTIEBOLAG, OF STOCKHOLM, SWEDEN.

YIELDABLE COUPLING, TOOTHED WHEEL, AND THE LIKE.

Application filed August 3, 1926, Serial No. 126,893, and in Sweden October 4, 1924.

This invention relates to yieldable couplings, toothed wheels and the like of that type in which the moment of torsion is transmitted by means of one or more curve shaped springs. The main object of the invention is to transmit the moment of torsion without the main parts of the coupling etc. such as shafts, hubs, toothed rim etc. are subjected to a bending moment. According to the invention the said springs consist of rings divided substantially transversal at one point and loosely mounted in the coupling etc. each ring encircling the center of the coupling and so arranged, that it always is subjected to the same kind of bending strain, independent of the direction in which the turning power operates. The invention also comprises some simplifications of the construction of the coupling etc. especially regarding the transmitting of the turning power to the curve shaped springs.

Figure 1:
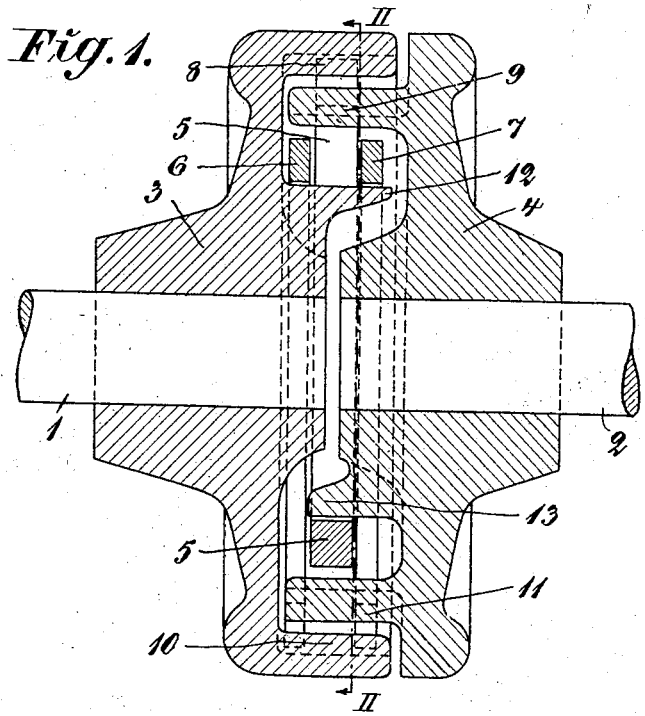
Figure 2:
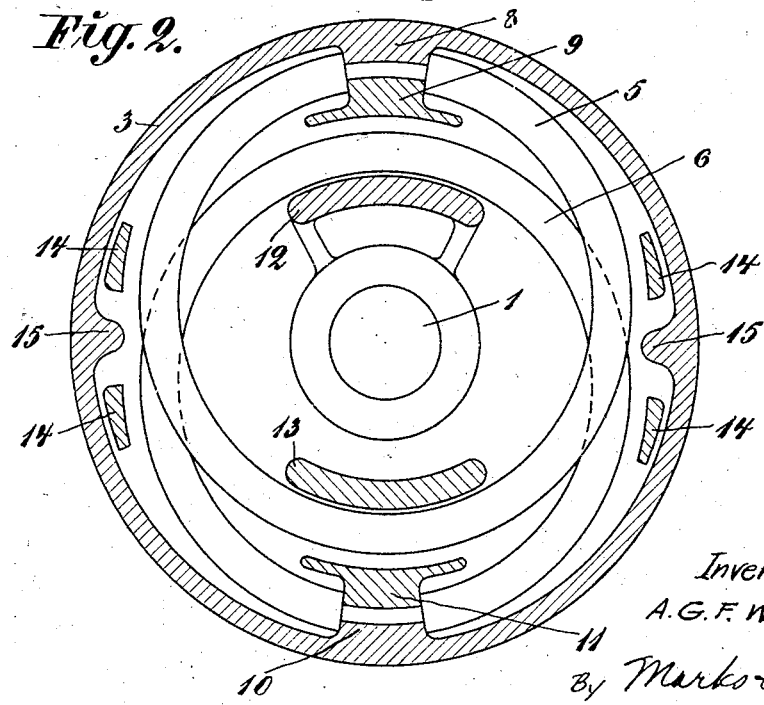

Some forms of execution are illustrated examples in the accompanying drawings. Fig. 1 is a section longitudinally of the axis of a yieldable coupling arranged in accordance with this invention. Fig. 2 is a cross section on the line II—II in Fig. 1. Fig. 3 shows in the same manner as Fig. 2 a modified form of the coupling. Fig. 4 shows in a section longitudinally of the axis a yieldable toothed wheel arranged in accordance with the invention. Figs. 5, 6 and 7 show details.

1 and 2, Figs. 1 and 2, designate the shafts of the coupling and 3 and 4 the coupling members. Between the said members are provided a central curve shaped spring 5 and two curve shaped springs 6 and 7 located at opposite sides of the said spring 5. The tension power of the central spring 5 and the yielding amount of the same correspond to the sum of the tension powers and the yielding amounts respectively of the springs 6 and 7. Member 3 is provided with a projection 8 located between the ends of the spring 5. Member 4 is provided with a projection 9 located inside the projection 8 and also between the ends of the spring 5. Diametrically to the projections 8 and 9 two projections 10 and 11 are provided, which are arranged in the same manner as the projections 8 and 9 and are located between the ends of the springs 6 and 7. In addition to the said projections inner projections 12 and 13 are provided on the coupling members 3 and 4, which together with the projections 9 and 11 restrict the liberty of motion of the springs 5, 6 and 7 and constitute some kind of guides for the same. Finally coupling member 4 is provided with two pairs of projections 14 located on opposite sides of projections 15 respectively provided on the coupling member 3. The object of the said projections 14 and 15 is to limit the rotary motion of the coupling members relatively to one another and thus prevent overloading of the coupling.

From Fig. 2 is perceived without closer explanation, that the coupling may be used with the same advantage for transmitting motion in both directions and that the springs always are subjected to strainings of the same kind, independently of the direction, in which the turning power operates. Thus, according to Fig. 2, the springs are bent outwards and not inwards. This, evidently, is of great importance with regard to the strength and durability of the springs and besides the springs always operate in the same manner and with the same force, which would not be the case, if the springs would be bent outwards, when the coupling rotates in the one direction, and inwards, when the coupling rotates in the other direction. Owing to the arrangement of the springs and the manner in which the turning power is imparted, neither the shafts nor the hubs or the toothed rim will be subjected to bending strains or other lateral strains, which is of an especially great importance. The points at which the turning force acts upon the springs, are located in the same plane viz, the center plane of the springs, and besides the points at which the turning force acts upon the central spring 5 are located diametrically opposite to the points on the springs 6 and 7 located at opposite sides of the spring 5. The points at which the resultant of the forces acts, operating through the springs 6 and 7, are located, evidently, in the same center plane as the points, at which the force acts, which operates through the spring 5. Owing to these facts it may not be questioned that the main parts of the coupling are subjected to any bending moments.

As perceived from the drawings it is not necessary to fix the springs to the coupling members, it is sufficient to loosely place the springs in the coupling, which constitutes an essential advantage with respect to the construction of the coupling. A certain play may be provided between the springs and the projections, so that there is no difficulty in putting the parts together and the ends of the shafts coupled together need not be located exactly co-axially. The ends of the springs and the projections co-operating with the same may be provided with teeth or the like, Fig. 6, in order to prevent the parts from sliding. The coupling members may be divided in any suitable manner, so that the springs are accessible in convenient manner. Openings may be provided in the members for providing the springs with a lubricating matter.

According to the form of execution now described the springs have eccentric positions relatively to the shafts 1 and 2. Although the said construction may be the most simple and advantageous, the springs may, however, be concentric to the said shafts. In this case the ends of the springs must be shaped in a special manner for gaining suitable bearing surfaces co-operating with the projections of the coupling members, for instance as shown in Fig. 3, in which the ends of the springs 5, 6 and 7 are bent outwards, so that they constitute abutments co-operating with the projections 8, 9, 10 and 11.

The invention is shown in Fig. 4 applied to a toothed wheel. The yieldable toothed wheel is founded on the same principle as the yieldable coupling shown in Figs. 1 and 2, for which reason a closer description of the same is not necessary. It may only be stated, that the hub is divided into two halves 17 and 18, between which the springs 5, 6 and 7 are located, the said halves being rigidly fixed to the shaft 19 by means of a key or in any other manner. The toothed rim enclosing the hub is designated by 20.

Fig. 5 illustrates the manner, in which the abutments or shoulders 21, which prevent overloading of the springs, may be provided at the sides of the projections 8.

According to Fig. 7 the coupling member 3 is provided at each projection 8 with a second auxiliary projection 8ˣ located inside the projection 8 and on the same radius. The projections 9 of the coupling member 4 extend into the spaces between the projections 8 and 8ˣ. According to this form of execution the power is transmitted centrally at the ends of the springs, which is an advantage.

Also in the form of execution last described bending moments, evidently, are obviated, in consequence whereof there is no risk of the toothed rim 20 rubbing on the halves of the hub in a degree worth mentioning or even getting jammed to the same, which on the other hand easily may happen in toothed wheels of previous constructions in consequence of the toothed rim occupying an oblique position with regard to the hub resulting from bending moments. In toothed wheels arranged in accordance with this invention the toothed rim is subjected to wholly central reaction from the curve shaped springs.

The invention may, evidently, be modified in many other ways without exceeding the limits of the same, for which reason the forms shown and described may be considered only as examples. The number of springs or sets of springs may, evidently, be varied.

I claim:

Yieldable coupling of the type including members for transmitting torsion power and springs located between said members and engaged by the same so as to be subjected to said power, comprising in combination three ring shaped springs loosely mounted side by side and encircling the centre of the coupling, the tension power of the central spring being substantially equal to the sum of the tension powers of the two other springs, each spring being divided transversely at one point to provide bearing members, projections on the power transmitting members cooperating with said bearing members of the springs, so that the turning of said power transmitting members effects one and the same kind of bending strain in the rings in whichever direction the turning force operates, and means for making the resultant of the turning force effective in the central spring, so as to avoid tilting movement on the main parts of the coupling during the transmitting of the power.

In testimony whereof I have hereunto affixed my signature.

AUGUST GUNNAR FERDINAND WALLGREN.